(12) United States Patent
Aylward et al.

(10) Patent No.: US 11,601,806 B2
(45) Date of Patent: Mar. 7, 2023

(54) DEVICE, COMPUTER PROGRAM AND METHOD

(71) Applicant: Sony Corporation, Tokyo (JP)

(72) Inventors: Conor Aylward, Stuttgart (DE); Hugo Embrechts, Stuttgart (DE); Dimitri Torfs, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 379 days.

(21) Appl. No.: 16/336,115

(22) PCT Filed: Sep. 14, 2017

(86) PCT No.: PCT/EP2017/073193
§ 371 (c)(1),
(2) Date: Mar. 25, 2019

(87) PCT Pub. No.: WO2018/059962
PCT Pub. Date: Apr. 5, 2018

(65) Prior Publication Data
US 2020/0029214 A1    Jan. 23, 2020

(30) Foreign Application Priority Data
Sep. 28, 2016    (EP) .................................... 16191188

(51) Int. Cl.
*H04W 12/06*    (2021.01)
*G06F 1/16*    (2006.01)
(Continued)

(52) U.S. Cl.
CPC ............ *H04W 12/06* (2013.01); *G06F 1/163* (2013.01); *G06F 21/32* (2013.01);
(Continued)

(58) Field of Classification Search
CPC ....... H04W 12/06; H04W 12/63; G06F 1/163; H04L 63/0861
See application file for complete search history.

(56) References Cited

U.S. PATENT DOCUMENTS 9,257,133 B1    2/2016 Strand
9,781,106 B1 *  10/2017 Vitus ................... H04W 12/065
(Continued)

FOREIGN PATENT DOCUMENTS

WO    2016/033698 A1    3/2016

OTHER PUBLICATIONS

Nymi Band, "Product Overview—Nymi", URL: https://nymi.com, 4 Pages total, (Jun. 26, 2019).
(Continued)

*Primary Examiner* — Ellen Tran
(74) *Attorney, Agent, or Firm* — Xsensus LLP

(57) ABSTRACT

A device for authenticating a user is described. This device comprises transceiver circuitry configured to receive motion information from a plurality of wearable devices located on a user's body indicative of the motion of the user's body at the location of the respective wearable device at a particular time; and 5 controller circuitry configured to: compare the received motion information and the location of the respective wearable device and authenticate the user in the event of a positive comparison between the received motion information and the location of the respective wearable device with stored motion information and the location of the respective wearable device.

17 Claims, 6 Drawing Sheets

(51) Int. Cl.
*G06F 21/32* (2013.01)
*H04L 9/40* (2022.01)
*H04W 12/65* (2021.01)
*H04W 12/33* (2021.01)
*H04W 12/63* (2021.01)

(52) U.S. Cl.
CPC ......... *H04L 63/0861* (2013.01); *H04W 12/33* (2021.01); *H04W 12/65* (2021.01); *H04L 2463/121* (2013.01); *H04W 12/63* (2021.01)

(56) References Cited

U.S. PATENT DOCUMENTS

| | | | |
|---|---|---|---|
| 2012/0316456 A1* | 12/2012 | Rahman | G06F 3/0346 600/547 |
| 2013/0267204 A1 | 10/2013 | Schultz et al. | |
| 2014/0089672 A1 | 3/2014 | Luna et al. | |
| 2014/0123249 A1 | 5/2014 | Davis et al. | |
| 2014/0236847 A1* | 8/2014 | Hamilton | G06Q 10/1093 705/319 |
| 2014/0249853 A1 | 9/2014 | Proud et al. | |
| 2015/0039880 A1* | 2/2015 | Aminzade | H04M 1/72409 713/100 |
| 2015/0070134 A1* | 3/2015 | Nagisetty | H04W 12/08 340/5.61 |
| 2015/0135284 A1 | 5/2015 | Bogard | |
| 2015/0151198 A1 | 6/2015 | Dugan et al. | |
| 2015/0172832 A1* | 6/2015 | Sharpe | G06F 21/35 381/328 |
| 2015/0242605 A1* | 8/2015 | Du | G06F 21/32 726/7 |
| 2015/0379255 A1* | 12/2015 | Konanur | G06F 21/35 726/19 |
| 2016/0021081 A1 | 1/2016 | Caceres et al. | |
| 2016/0063492 A1* | 3/2016 | Kobres | G06Q 20/4016 705/16 |
| 2016/0094974 A1 | 3/2016 | Muttik et al. | |
| 2016/0173169 A1* | 6/2016 | Liu | H04B 5/0012 455/41.1 |
| 2016/0174071 A1* | 6/2016 | Weast | H04W 12/64 455/411 |
| 2016/0182496 A1* | 6/2016 | Weast | H04W 12/06 726/3 |
| 2016/0187974 A1* | 6/2016 | Mallinson | G06F 1/163 463/32 |
| 2016/0306955 A1* | 10/2016 | Martin | G06F 21/35 |
| 2017/0011210 A1* | 1/2017 | Cheong | H04W 4/00 |

OTHER PUBLICATIONS

Sound-Proof, "Seamless Two-Factor Authentication for the Web", URL: http://sound-proof.ch, 5 Pages total, (Jun. 26, 2019).
SoundLogin, "SoundLogin—Two-Factor Authentication. Main", 2 Pages total, (Jun. 26, 2019).
Morrison, W., "Wearable Devices and the Future of Two Factor Authentication", LOGIN TC, 6 Pages total, (Dec. 18, 2013).
Graham, K., "The Role of Behavioural Biometrics in Authentication", IT Pro Portal, 5 Pages total, (Mar. 31, 2016).
Al-Khazzar, A., et al., "Graphical Authentication based on User Behavior", University of Portsmouth, 4 Pages total, (2010).

* cited by examiner

DEVICE, COMPUTER PROGRAM AND METHOD

CROSS-REFERENCE TO RELATED APPLICATIONS

The present application is based on PCT filing PCT/EP2017/073193, filed Sep. 14, 2017 which claims priority to EP 16191188.8 filed Sep. 28, 2016, the entire contents of each are incorporated herein by reference.

BACKGROUND

Field of the Disclosure

The present technique relates to a device, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Authentication of a user is an important issue in modern technology. With more and more sensitive information being stored, hackers and malicious attackers are becoming more sophisticated in circumventing known authentication techniques. This is particular the case with new emerging technologies such as wearable technology where the constrained interfaces make it difficult to authenticate the user with certainty.

It is an aim of the disclosure to address at least this issue.

SUMMARY

According to an aspect of the disclosure, there is provided a device for authenticating a user, comprising transceiver circuitry configured to receive motion information from a plurality of wearable devices located on a user's body indicative of the motion of the user's body at the location of the respective wearable device at a particular time; and controller circuitry configured to: compare the received motion information and the location of the respective wearable device and authenticate the user in the event of a positive comparison between the received motion information and the location of the respective wearable device with stored motion information and the location of the respective wearable device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
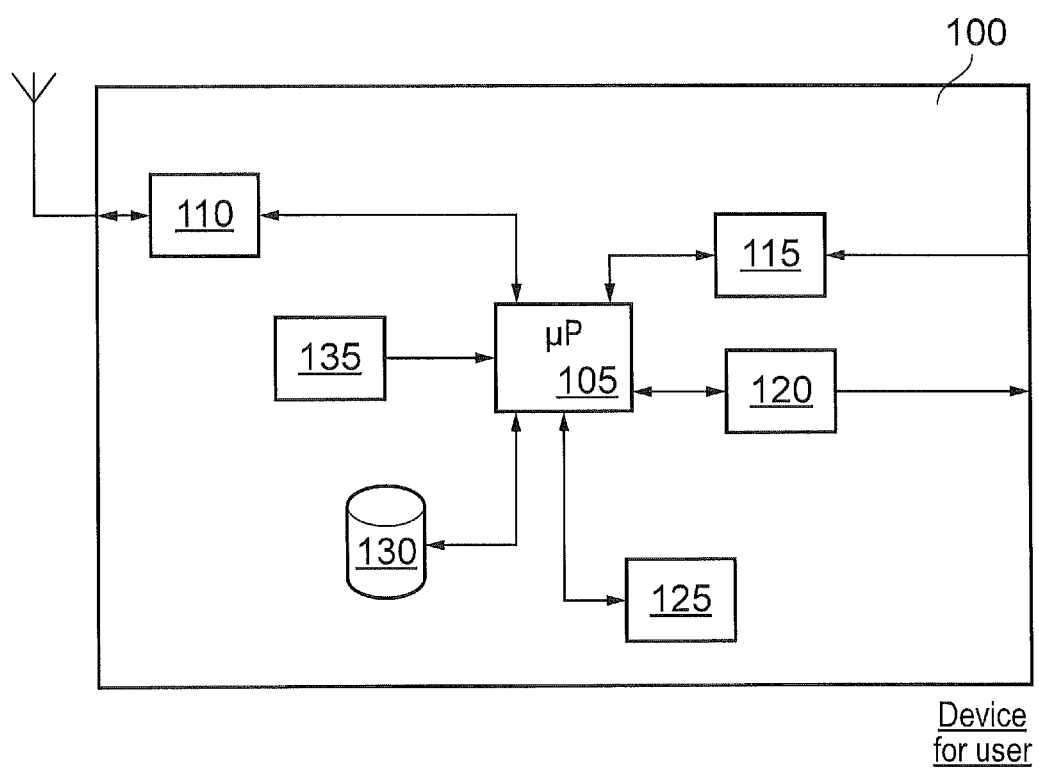
FIG. 1A shows a device 100 according to embodiments of the present disclosure.

Referring now to the drawings, wherein like reference numerals designate identical or corresponding parts throughout the several views.

FIG. 1A shows a device 100 according to embodiments of the disclosure.

In embodiments of the disclosure, the device 100 is a wearable device such as a fitness band or smartwatch which the user wears that comprises a controller 105. Of course, the device 100 is not so limited and may be any device 100 with which the user interacts or which is habitually or occasionally carried on the body. Indeed, the device 100 may be any device which the user interacts and which may be used to authenticate a user (for example a home hub such as the Xperia® Agent) or may be on the cloud. The device 100 is connected to other devices configured to act only as sensors whose purpose is to capture information at a location on the user's body. The device 100 then receives the sensed information to authenticate the user.

The controller 105 may be implemented as controller circuitry comprising hardware that is configured to perform certain method steps. The method steps are defined by computer readable code that is stored within storage 130 attached to the controller 105. The storage 130 may be optically readable storage or maybe solid state storage or the like.

Also connected to the controller 105 is a transceiver 110. The transceiver comprises circuitry that allows the device 100 to communicate with other devices and/or a network. This communication, in embodiments, will be wireless and may be performed using WiFi, Bluetooth, NFC, cellular communication or the like. An antenna 112 is provided to facilitate such communication.

In addition or as an alternative to the above, the transceiver 110 may be a sound transducer which may communicate with other devices using a sound wave. The sound wave may be audible to the human ear or may be ultrasonic or infrasonic. In this case, the antenna 112 may not be required.

Additionally attached to the controller 105 is an optional microphone 135. The microphone 135 detects the sound from the location of the device 100. This sound may be for example a voice command from a user or may be the ambient sound of the device 100. The "ambient sound" is a term known to the skilled person and means the background sound which is present at the location of the device 100. The microphone 135 may be embodied as microphone circuitry and may be a capacitive or a resistive type microphone.

Additionally connected to the controller 105 are sensors 125. These sensors may be embodied as modules or circuitry located within the device 100 that perform certain functions and quantify certain physical or environmental conditions presented to or asserted on the device 100. Examples of sensors include accelerometers, barometers, gyroscopes, magnetometers and the like. In embodiments, other sensors include image sensors that capture an image of the surroundings of the device 100. These types of sensors are known to the skilled person. Moreover, the sensors may capture the ambient sound and may then determine movement using the Doppler shift of the sound as the user moves the device.

Optionally connected to the controller 105 is a user output module 120. The user output module may be a display, or connected to a display, that provides a visual output. An example of this is if the device 100 is a headset, such as an augmented reality headset, whereby the user output module 120 is a head-up display where a graphic is overlaid over a real world scene. Additionally or alternatively, the user output module 120 may be a haptic feedback device that presents the user with a specific vibration indicating a certain output. However, any output that can be understood by the user can be provided by the user output module 120.

Optionally connected to the controller 105 is a user input module 115. The user input module 115 may be a touch screen wherein the user instructs the device 100 to perform certain functions using a touch screen mechanism. Alternatively, or additionally, the user input module 115 may be an image sensor (which may be the same as or different to one embodied as a module in sensor 125) that captures an image of the user interacting with an object overlaid on an augmented reality display. For example, the user input module 115 may be an image sensor that captures the position of the user's hand and acts as a gesture recognition module. That is, the movement and position of the user's hand may be captured and certain actions performed in response to the captured movement and position. An example of this is if the user input module 115 is a dual lens camera and the associated image sensors and graphic processing engine which are arranged for depth perception. This gives increased accuracy in the detection of hand and forearm movements.

In particular, in embodiments of the present disclosure, the device 100 is used as a device for authenticating the user. As will be explained, the authentication, in embodiments, is performed by analyzing the movement and/or physical traits of the user at various locations around the body. In other words, when the user is performing certain actions, such as walking, the motion and position of each device on the user's body will be unique to the user. By comparing the motion and position of each device with an authenticated template, authentication of the user can be performed. Depending upon the type of motion and position information, the movement and position over a period of time may need to be captured. For example, if the user's movement when walking is being captured for authentication, a sample every 10 ms over a 2 second window will be required to allow the user to perform a complete step.

In order to analyse the movement and/or physical traits of the user, the device 100 may be connected wirelessly to other similar devices 100 who return the user's movement at a particular position at a given time or may be connected to other sensors which merely sense the movement and/or position or biometric characteristic of the user at particular position on the user's body.

Figure 1B:
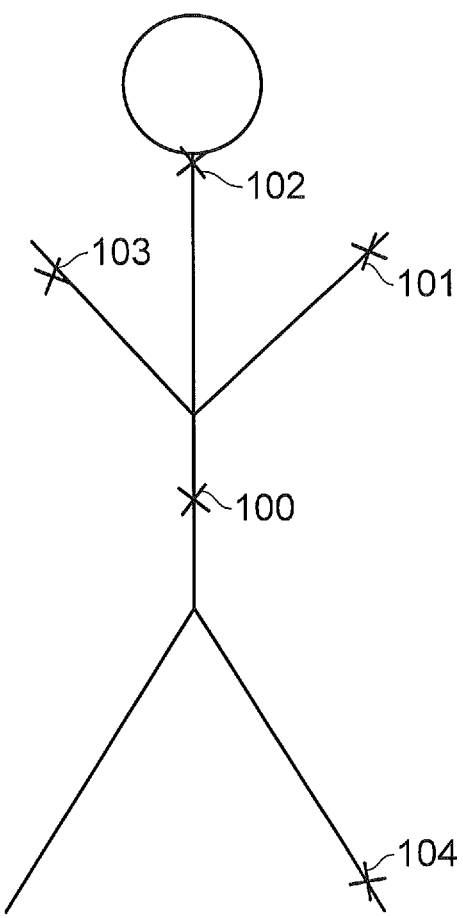
FIG. 1B shows the device 100 connected to other wearable devices on a user.

FIG. 1B shows a diagram of a user wearing device 100. As can be seen, device 100 is located on the torso of the user, or may be in a pocket of a user. Device 100 is communicating with sensors 101 (a smartwatch worn around a user's wrist), 102 (a smart pendant worn around a user's neck), 103 (a fitness band worn around a user's wrist), and 104 (a trainer worn on the user's foot). These sensors may be embodied devices which are configured to only sense movement and/or location information at their respective positions or may be simple sensors whose purpose is to only measure movement and/or location information of the user at the position.

Figure 2:
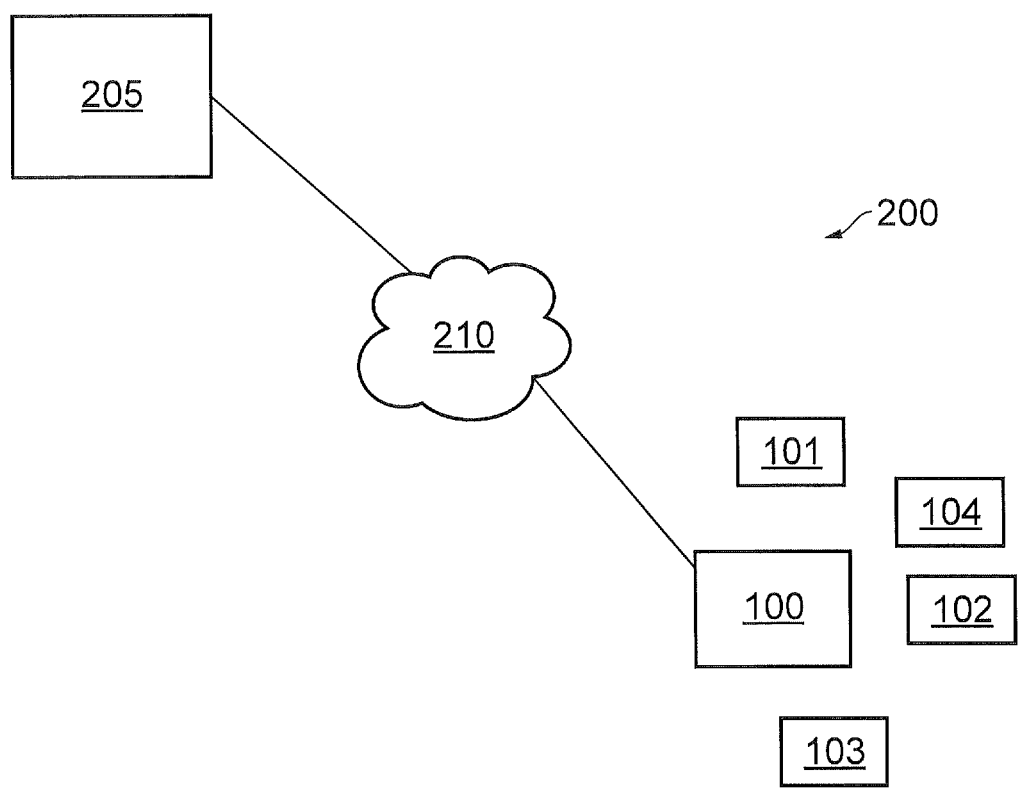
FIG. 2 shows a system 200 according to embodiments of the present disclosure

FIG. 2 describes a system 200 according to embodiments of the disclosure. The system of embodiments of the disclosure include a resource 205 which may be a server located in a cloud provided by a cloud based service provider. Alternatively, the resource 205 may be a controlling device which is located in a network to which the device 100 is connected. In other words, the resource 205 may be located on the cloud and may provide services such as authentication or storage of user profiles. That is, the resource 205 may perform the function of the authentication device 100. Alternatively, the resource 205 may be located on a local network and the resource 205 may be hub that contains equivalent information. An example of this hub is an Xperia Agent® or the like.

In embodiments, the device 100 is connected to the resource 205 via a network 210. The device is also connected to other wearable devices 101, 102, 103 and 104. The network 210 may therefore be a local area network, a wide area network or the internet.

The operation of embodiments of the disclosure will now be described.

During a training phase, the user wears or carries a plurality of wearable devices in a similar manner to everyday usage. Typically, these wearable devices will perform certain functions. For example, the user may wear a smartwatch, earbuds, a fitness band and carry a smartphone. It is possible that each of these devices 100 is envisaged as embodying the disclosure. However, it should be borne in mind that although there is a plurality of wearable devices worn or carried by the user, only one device 100 is required to authenticate the user. The device 100 receives movement and/or location information from the wearable devices. The device 100 may be carried by the user or may be the hub or on the cloud.

The wearable devices are carried by the user every day and are worn or carried on different parts of the body. For example, earbuds are worn in the ears and so are capable of analysing the movement of a user's head relative to the vertical (as earbuds have to be worn in a specific manner to avoid falling out). Similarly, a smartwatch is worn on the wrist and so moves when the user walks, a smartphone is typically carried in a pocket, or in the hand or held to the ear of the user which again moves when a user walks and a fitness band is worn on a user's wrist and so moves when the user moves his or her hand or arm.

During the training phase, an authenticated user will perform tasks similar to those performed in everyday life. For example, the user will be asked to sit down at a desk, walk, run and the like. In order to facilitate the training phase, some factory provisioned or downloaded code may be used to ask the user to confirm their current state. This will assist the user during the training phase as the user will not have to perform certain tasks. In embodiments, the motion of the user at the various locations and the distance between the devices 100 at each of the locations is measured and stored as will be explained in FIG. 3.

Figure 3:
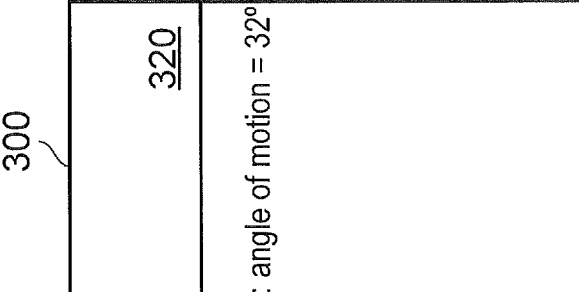
FIG. 3 shows a schematic diagram of a template storing user information according to embodiments.

FIG. 3 shows a table 300 populated after a training phase has been completed. It should be noted here that the table 300 has been populated for a single task. In example embodiments of the disclosure, information can be stored in other forms. For example, snapshots could be taken at different time instances and processed into behavioural samples. The samples could then be kept as templates (without necessarily association with specific tasks). Further, for example, in the field of neural network and machine learning, the user characteristics within the table form a unique user signature or behaviour. The confidence in an authentication score for the user may be maintained in the internal thresholds and states of a machine learning or neural network model. In the case of a neural network, the inputs are selected that best correlate to the output to authenticate the user. This means that the inputs to the neural networks for one user may be very different to those for another user. So, and as will be appreciated, there is not one algorithm used for all users but rather there will be many algorithm variations used combined with differences in user inputs to authenticate between many users.

In the example of FIG. 3, the table 300 is populated after a user has performed a walking task. The populated table may be stored in the storage 130 of device 100. It is anticipated that the table will be stored securely by encryption or another means.

The table 300 includes a number of columns for each particular task.

In the user identity column 305, each user for which authentication will be required is given a unique identifier. This allows each user to be uniquely identified compared to other users.

A wearable identifier 310 is also provided. The wearable identifier 310 is a unique identifier identifying each wearable device that is associated with the particular user. Although in the example of FIG. 3, the wearable identifier is simply a numerical value, it is anticipated that the wearable identifier may be a MAC address or some other unique identifier that is associated with that particular wearable. In this case, it can be seen that four wearables are associated with the task performed by user 1.

A distance matrix 315 is also provided in table 300. The distance matrix 315 is a matrix storing the distance of each of the wearables from each of the wearables stored in the device identifier column 310. So, in the example of FIG. 3, the distance between wearable 1 and wearable 2 is 2.3 cm, the distance between wearable 1 and wearable 3 is 1.2 m, and the distance between wearable 1 and wearable 4 is 1.5 cm. Similarly, the distance between wearable 2 and wearable 3 is 1.3 m and the distance between wearable 2 and wearable 4 is 3.9 cm. Although only two columns of the distance matrix 315 are shown, it is envisaged that the distance matrix 315 will contain as many columns as there are wearables stored against a particular task.

The distance matrix 315 provides an indication of the physical size of user 1. For example, if wearable 1 is an ear bud and wearable 4 is a smartphone, the distance between the ear and the pocket of the user when performing this task is 1.2 m.

In the example of FIG. 3, the distances between the respective wearables may be determined using a specific sensor located in the wearable such as a microwave omitting sensor or an infrared sensor. Alternatively, the device may retrieve the distance information from an ultra-wide band radio connection connecting each of the devices. These microwave based systems provide high accuracy measurements.

Finally, a velocity device column 320 is shown. In this column, the movement of the particular wearable at the particular location is stored. So, in this example, the speed of wearable 1 is 1 m/s and its angle of motion is 32 degrees. This information is provided by sensors within wearable. For example, an accelerometer can determine the angle of motion and speed of the wearable. Of course, although speed of the wearable is stored, any metric identifying the movement of the wearable is envisaged.

Although the foregoing has described movement and location of the wearable, other context information may also be provided. For example, the user's location may be taken from a GPS or whether the user is located indoors, time of day taken from a cellular network or on-board clock or known social connections close by. For example, the user may be located at a certain location at a certain time of day. This can be used to assist in the authentication.

After training has been completed, the device moves to authentication mode. In authentication mode, the movement of each device and the distance between the devices is captured. For each capturing event, each respective device generates a time stamp indicating when the motion was captured. This ensures that the distances between each device, and the motion of the device, at a single point in time is compared. Further, it is possible that each device will capture the measurements in response to a synchronisation signal. This ensures that each device captures the movement at the same time.

Figure 4:
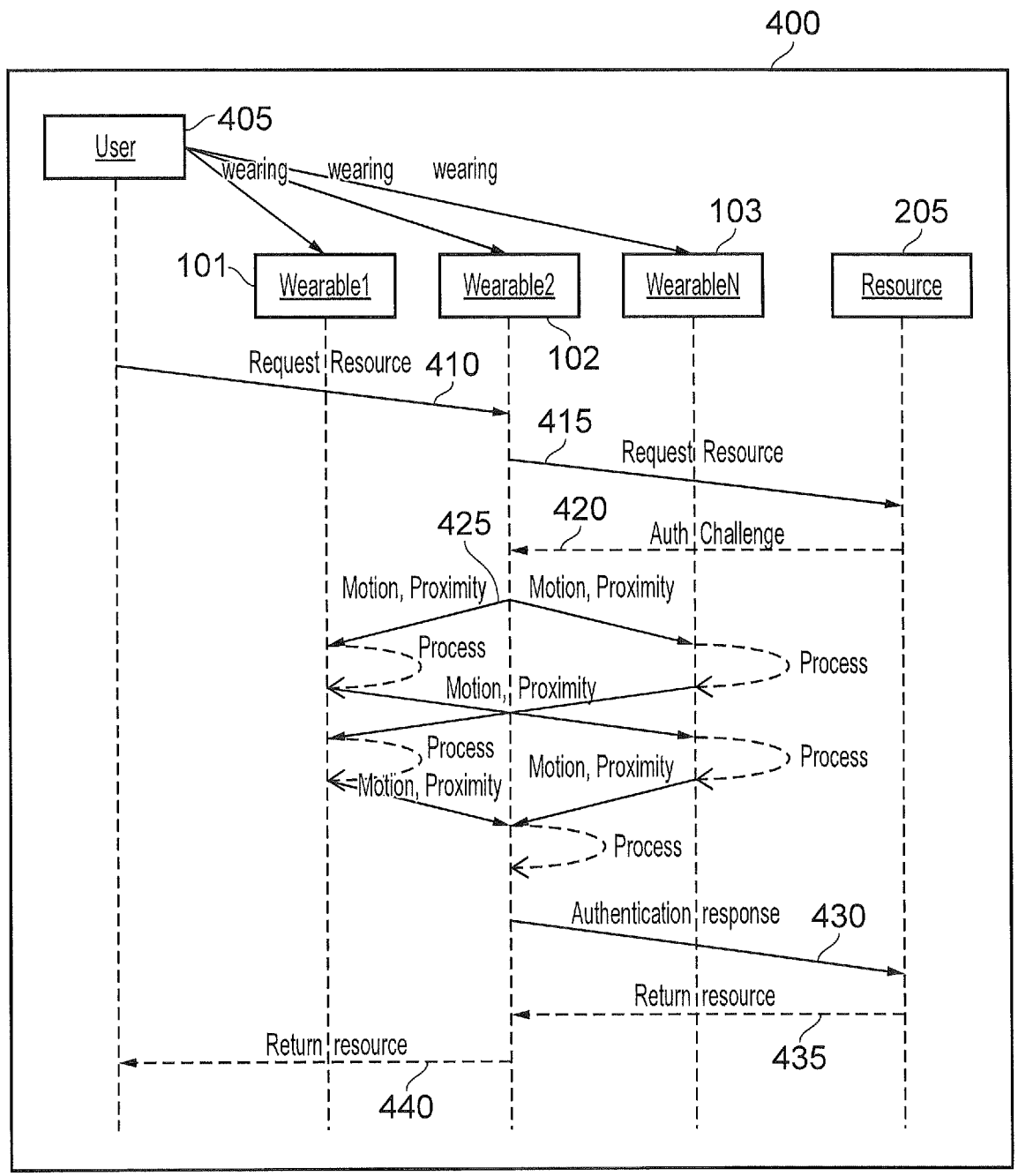
FIG. 4 shows a process explaining according to embodiments of the disclosure.

FIG. 4 shows a flowchart explaining the authentication process according to embodiments of the disclosure. The process 400 starts when a user wears a plurality of wearable devices. In the flowchart of FIG. 4, the user is wearing wearable 1, wearable 2 and other wearable devices up to wearable N. In this instance, wearable 2 is device 100. The wearable devices communicate with one another using an Ultra-Wide Band wireless connection to transfer device identifiers and allow distances between the respective devices to be measured. Of course, any wireless communication is envisaged, especially a communication mechanism that also has high proximity accuracy. This distance information may be derived from the signal with which the wearable devices communicate or a separate signal as would be understood by the skilled person.

The user 405 requests a resource of wearable 2 100b in step 410. For example, Wearable 2 may be a smart watch and the user wishes to access a banking app which contains sensitive information. Wearable 2 100b then send a request to resource 205 in step 415. This request is to allow Wearable 2 access to the banking app.

In order to authenticate the identity of the user, resource 205 sends a challenge to wearable 2 100b. This challenge is performed in step 420. The challenge will instruct the user 405 to perform a task for which a training phase has already been carried out.

Of course, other options may be used to authenticate a user. Firstly, a constantly updated table 300 may be provided. In this instance, wearable 2 (the device) is periodically updated with movement and/or position information from the other wearable devices. This information is stored and regularly compared with the stored template. If the user has been authenticated within a predetermined time period of the challenge, wearable 2 authenticates the user.

In embodiments, a continuous authentication score is provided for each user. For example, from this periodically captured information, it is possible to authenticate the user to a high degree of accuracy due to the movement of the user. However, if the user has performed very little movement in the recent past, the user's authentication score will decrease. But, the authentication score may still be high enough to authenticate the user for a low risk activity such as a low value purchase in a shop. In other words, by maintaining a continuous authentication score, a user's highly accurate authentication information over a period can offset less accurate authentication information.

In examples, the specific challenge may be used when a high accuracy authentication is used and the continuous confidence score may be used where a less accurate authentication is required.

Returning to FIG. 4, in this instance, Wearable 2 100b sends a synchronisation signal to each of wearable 1 to wearable N. In response to the synchronisation signal, each wearable device returns its column in the distance matrix and the movement information to the requesting device. In other words, in response to the synchronisation signal, each device captures its distance from each of the other devices and the movement of the device, and returns this to the requesting device. Of course, if the other wearables continuously sent the location and/or movement information, each wearable would not need to maintain the distance matrix.

The requesting device (in this case Wearable 2) may then either compare the returned results with the table 300 stored locally or in a hub type device within a local network or on the cloud. Authentication then can occur.

In order to authenticate the user, the measured distance and/or movements must be within a predetermined threshold of the stored distance and/or movement. For example, for the user to be authenticated to a first level of confidence, the speed of movement must be within 0.2 m/s of that stored in the table 300. Additionally, or alternatively, the sum of the distances between all of the devices must be with 0.1 cm of that stored in the table 300. It is desired to use the sum of the distances because the more devices on a user, the higher the authentication level.

However, if the user is to be authenticated to a second, higher, level of confidence, the speed of movement must be within 0.1 m/s of that stored in table 300. The level of confidence may be set by the user or by the resource 205. So, for more sensitive information such as access to banking information where a high level of confidence is required, the user would be authenticated to the second level of confidence. However, if the user simply wants access to non-sensitive information such as stored music, the first level of confidence will suffice.

After authentication, Wearable 2 100b sends an authentication response to resource 205 in step 430. Of course, the authentication may take place in resource 205 and in this case, wearable 2 100b would return the motion and proximity information used for authentication to resource 205 so that resource 205 can authenticate the user. In other words, wearable 2 may send the movement and/or location information of wearable 1, wearable 3 and wearable N to resource 205 in the event that resource 205 performs the authentication. This prevents the case where wearable 2 is hacked and returns a good authentication sample and spoofs access to 205. It is assumed it would be difficult (or at least no financial motive) to hack all devices at the same time.

In the event of a positive authentication, the resource 205 returns the required data in step 435. The resource, in embodiments, returns the data to wearable 2 100b. Wearable 2 100b then returns the resource to the user 405.

Figure 5:
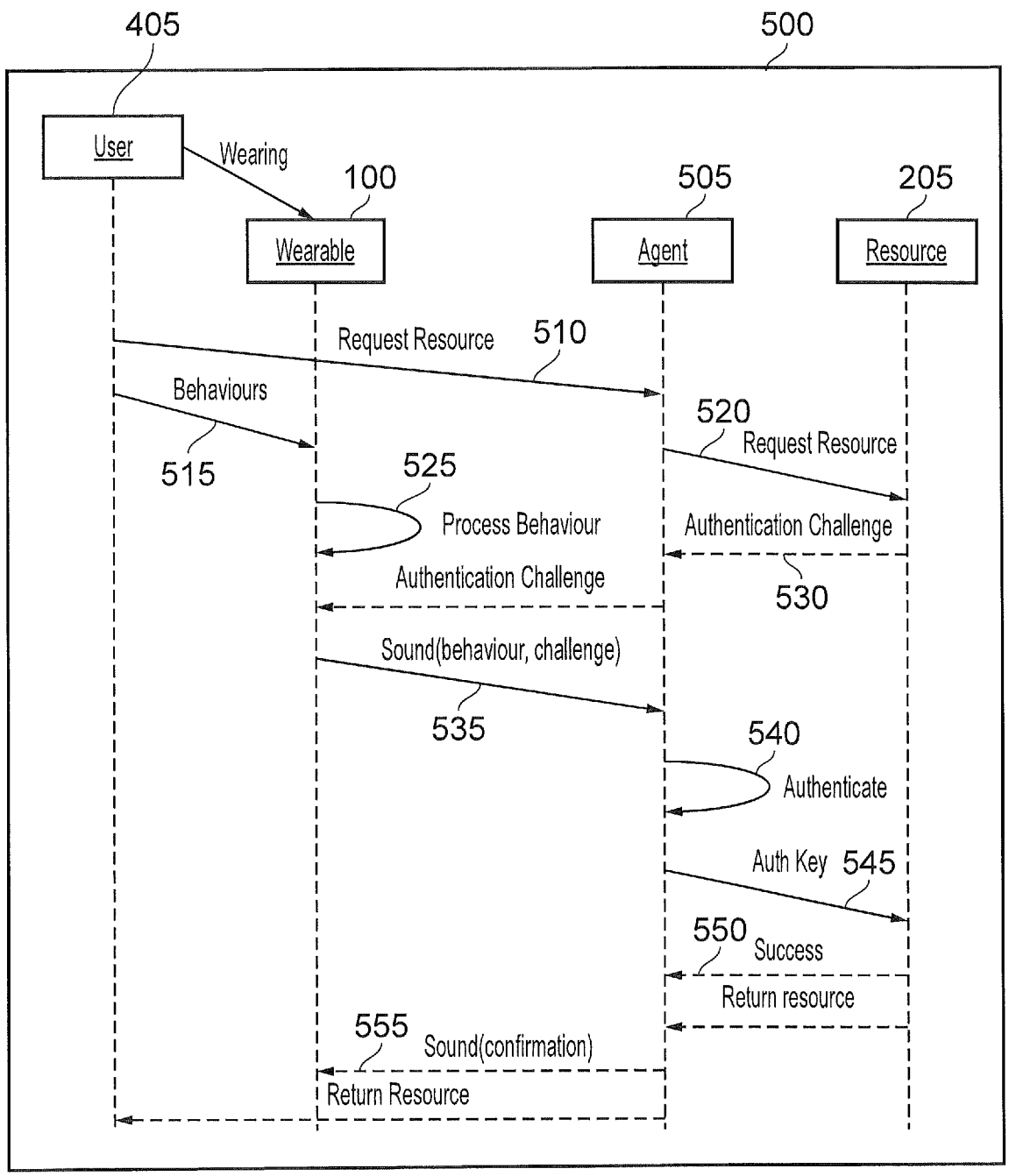
FIG. 5 shows a process according another embodiment of the disclosure.

FIG. 5 shows a flowchart 500 explaining the process associated with another embodiment of the disclosure. The embodiment of FIG. 5 may use the authentication method described with reference to FIG. 4. Alternatively, the embodiment of FIG. 5 may use a different authentication method.

In this embodiment, user 405 wears at the device 100. This device 100 may communicate with other wearables carried by or located on the user. Additionally provided within this embodiment is an agent 505. The agent 505 is, in embodiments, an intermediary between the device 100 and the resource 205. In other words, the device 100 communicates with the resource 205 via the agent 505. As would be appreciated, though, agent 505 is an optional component and is not required.

User 405 wears device 100. The user then requests a resource in step 510. Similarly to the other embodiments, the resource 205 may be a banking app or any kind of resource where sensitive information is exchanged. The user 405 may directly request this resource from device 100 or, as in this case, may request this resource from agent 505. Of course, no specific request may be provided by the user and the authentication may be automatically provided in the event that the user approaches a smart door or similar. At the same or similar time to requesting the resource from the agent 505, the device 100 measures the behaviour of the user. This means that the device 100 measures a characteristic of the user such as the movement of the device 100 (and thus the user), or a configuration of other wearable devices as described in FIG. 4. As an alternative, a biometric measurement may be provided. This will enhance the security of the system.

The agent 505 then requests the resource from resource device 205 in step 520. Typically, as in the previous embodiments, the resource may be content associated with the user such as photographs or may be a specific application such as a banking app for which the user desires access.

In response to this request, resource 205 sends a challenge to the agent 505. This is step 530. This challenge may simply ask the device 100 for the movement of the device 100 and/or the other wearables.

Alternatively, the challenge may define the level of the confidence of authentication required from the device 100. This was explained with reference to FIG. 4. The device 100 then may perform the authentication and return the result of the authentication to the agent 505 or the resource 205.

In this instance, the device 100 does not perform the authentication and so the challenge is a request to return a sample of the behaviour of the user. The device 100 encodes the behavioural sample of the user as a sound in step 535 and returns this sound to the agent 505. This encoding could be achieved using a standard audio watermarking in any type of sound sample to securely encode the response. One example, would be, for example, spread spectrum watermarking. See https://en.wikipedia.org/wiki/Audio_watermark as an example. By providing the sample as a sound, the complexity of the device is reduced and the information is provided in a low power manner. Further, the user does not have to perform any additional functions in order to be authenticated. Specifically, the device 100 may provide the information automatically. This information may be a continually updated confidence score or may be the movement and/or position information as explained with reference to FIG. 4.

The agent 505, which in this case stores table 300, decodes the received sound in step 540 and authenticates the identity of the user 405 to the level of confidence defined by the resource 205. The agent 505 then optionally returns an authentication success message to the resource 205 in step 545. This informs the resource 205 that the user has been successfully authenticated to the desired level of confidence.

Alternatively, as in the case of FIG. 5, after decoding in step 540, the agent 505 returns the response to the authentication challenge back to the resource 205 in step 545. In other words, the agent 505 in this case, acts as a conduit between the device 100 and the resource 205. The resource 205 then authenticates the user. This may be achieved by the resource 205 storing table 300 or the relevant section of the table 300 may be sent from the agent 505 to the resource 205 in step 545.

In this instance, the user is successfully authenticated (either by the agent 505 or the resource 205) and the data is returned along with a success signal notifying the agent 505 that the user has been successfully authenticated. The agent 505 then encodes the success message and sends, via sound to the device 100 that the user has been successfully authenticated.

The resource is then returned from the agent 505 to the user 405 in step 555.

It should be noted that prior to step 525, the agent 505 or device 100 may sample the ambient sound. In this case, if the ambient sound intensity is greater than a threshold, then the agent 505 may send an authentication challenge to device 100 instructing the user to authenticate using facial recognition. Of course, the device 100 can send this to the Agent 505 at the appropriate time. Alternatively, the agent 505 may request the device 100 to communicate the authentication challenge response over a wireless communication mechanism rather than by using sound.

In other embodiments, in response to authentication challenge 525, the device 100 may require the user to interact with the device 100 (by shaking or touching the device 100) before returning the sound or otherwise transmitting the authentication sample. This increases the security of the system because the user may not wish to allow the sound to be transmitted at that time.

Further, if the device 100 is removed from the user 405, the agent 505 may be informed.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A device for authenticating a user, comprising transceiver circuitry configured to receive motion information from a plurality of wearable devices located on a user's body indicative of the motion of the user's body at the location of the respective wearable device at a particular time; and controller circuitry configured to: compare the received motion information and the location of the respective wearable device and authenticate the user in the event of a positive comparison between the received motion information and the location of the respective wearable device with stored motion information and the location of the respective wearable device.

2. A device according to clause 1, wherein the particular time is identified by a timestamp.

3. A device according to clause 1 or 2, wherein the transceiver circuitry is configured to transmit to the plurality of wearable devices a synchronisation signal, and in the event of a request for authentication, the controller circuitry is configured to instruct the transmitter circuitry to transmit a synchronisation signal to the other wearable devices in response to which, each of the other wearable devices transmits the motion information.

4. A device according to any preceding clause, wherein the receiver circuitry is configured to receive motion information over an ultra-wide band radio connection.

5. A device according to any preceding clause, wherein the motion information is accelerometer, gyroscopic, magnometer, barometer sensor information or ambient sound.

6. A device according to any preceding clause, wherein the transceiver circuitry is configured to receive biometric data from a further wearable device located on the user, and the controller circuitry is configured to authenticate the user when the received biometric data matches biometric data associated with the user.

7. A device according to any preceding clause, wherein the received location information is location information of the wearable device relative to one other wearable device.

8. A device according to any preceding clause wherein the transceiver circuitry is configured to encode the motion information as sound.

9. A device according to clause 8, wherein in the event of transmitting no motion information encoded as sound, the transceiver circuitry is configured to receive a facial recognition request indicating that the user must authenticate using facial recognition.

10. A device according to clause 8 or 9, wherein the transceiver circuitry is configured to receive ultrasound or infrasound.

11. A method for authenticating a user, comprising receiving motion information from a plurality of wearable devices located on a user's body indicative of the motion of the user's body at the location of the respective wearable device at a particular time; comparing the received motion information and the location of the respective wearable device; and authenticating the user in the event of a positive comparison between the received motion information and the location of the respective wearable device with stored motion information and the location of the respective wearable device.

12. A method according to clause 11, wherein the particular time is identified by a timestamp.

13. A method according to clause 11 or 12, comprising transmitting to the plurality of wearable devices a synchronisation signal, and in the event of a request for authentication, the method comprises transmitting a synchronisation signal to the other devices in response to which, each of the other wearable devices transmits the motion information.

14. A method according to any one of clauses 11 to 13, comprising receiving motion information over an ultra-wide band radio connection.

15. A method according to any one of clauses 11 to 14, wherein the motion information is accelerometer, gyroscopic, magnometer, barometer sensor information or ambient sound.

16. A method according to any one of clauses 11 to 15, comprising receiving biometric data from a further wearable device located on the user, and authenticating the user when the received biometric data matches biometric data associated with the user.

17. A method according to any one of clauses 11 to 16, wherein the received location information is location information of the wearable device relative to one other wearable device.

18. A method according to any one of clauses 11 to 17 comprising encoding the motion information as sound.

19. A method according to clause 18, wherein in the event of transmitting no motion information encoded as sound, the method comprises receiving a facial recognition request indicating that the user must authenticate using facial recognition.

20. A method according to clause 18 or 19, comprising encoding the sound as ultrasound or infrasound.

21. A computer program product comprising computer readable code which, when loaded onto a computer, configures the computer to perform a method according to any one of clauses 11 to 20.

The invention claimed is:

1. A device for authenticating a user, comprising:
transceiver circuitry configured to receive motion information from a plurality of wearable devices located on a user's body indicative of the motion of the user's body at the location of the respective wearable device at a particular time, wherein the device is periodically updated with motion information to determine a continuous authentication score,
in response to a request for authentication, transmit a synchronization signal to the plurality of wearable devices, and
in response to transmitting the synchronization signal, receive, from each of the plurality of wearable devices, motion information and each wearable device's distance from each of other of the plurality wearable devices; and
controller circuitry configured to
compare the received motion information and the location of the respective wearable device, and
authenticate the user in the event of a positive comparison between the received motion information and the location of the respective wearable device with stored motion information and the location of the respective wearable device,
wherein the location of the respective wearable device is relative to each of wearable devices 1-N, where N is 3 or more, of the plurality of wearable devices, and the controller circuitry for successful authentication is further configured to
receive, from each of the wearable devices 1-N, a distance between each of the wearable devices 1-N and the respective wearable device,
determine that a sum of the distances between all of the plurality of wearable devices is within a predetermined threshold of a stored distance, and
in response to a determination that the sum of the distances is within the predetermined threshold, achieve a higher level of authentication compared to N being less than 3 based on an inherent error in each distance measurement compounding and still being within the predetermined threshold.

2. The device according to claim 1, wherein the particular time is identified by a timestamp.

3. The device according to claim 1, wherein the receiver circuitry is configured to receive motion information over an ultra-wide band radio connection.

4. The device according to claim 1, wherein the motion information is accelerometer, gyroscopic, magnometer, barometer sensor information or ambient sound.

5. The device according to claim 1, wherein the transceiver circuitry is configured to receive biometric data from a further wearable device located on the user, and the controller circuitry is configured to authenticate the user when the received biometric data matches biometric data associated with the user.

6. The device according to claim 1 wherein the transceiver circuitry is configured to encode the motion information as sound.

7. The device according to claim 6, wherein in the event of transmitting no motion information encoded as sound, the transceiver circuitry is configured to receive a facial recognition request indicating that the user must authenticate using facial recognition.

8. The device according to claim 6, wherein the transceiver circuitry is configured to receive ultrasound or infrasound.

9. A method for authenticating a user, comprising:
receiving motion information from a plurality of wearable devices located on a user's body indicative of the motion of the user's body at the location of the respective wearable device at a particular time, wherein the device is periodically updated with motion information to determine a continuous authentication score;
in response to a request for authentication, transmitting a synchronization signal to the plurality of wearable devices;
in response to transmitting the synchronization signal, receiving, from each of the plurality of wearable devices, motion information and each wearable device's distance from each of other of the plurality wearable devices;
comparing the received motion information and the location of the respective wearable device; and
authenticating the user in the event of a positive comparison between the received motion information and the location of the respective wearable device with stored motion information and the location of the respective wearable device,
wherein the location of the respective wearable device is relative to each of wearable devices 1-N, where N is 3 or more, of the plurality of wearable devices,
wherein successful authentication includes
receiving, from each of the wearable devices 1-N, a distance between each of the wearable devices 1-N and the respective wearable device;

determining that a sum of the distances between all of the plurality of wearable devices is within a predetermined threshold of a stored distance; and in response to a determination that the sum of the distances is within the predetermined threshold, achieving a higher level of authentication compared to N being less than 3 based on an inherent error in each distance measurement compounding and still being within the predetermined threshold.

10. The method according to claim 9, wherein the particular time is identified by a timestamp.

11. The method according to claim 9, comprising receiving motion information over an ultra-wide band radio connection.

12. The method according to claim 9, wherein the motion information is accelerometer, gyroscopic, magnometer, barometer sensor information or ambient sound.

13. The method according to claim 9, comprising receiving biometric data from a further wearable device located on the user, and authenticating the user when the received biometric data matches biometric data associated with the user.

14. The method according to claim 9 comprising encoding the motion information as sound.

15. The method according to claim 14, wherein in the event of transmitting no motion information encoded as sound, the method comprises receiving a facial recognition request indicating that the user must authenticate using facial recognition.

16. The method according to claim 14, comprising encoding the sound as ultrasound or infrasound.

17. A non-transitory computer-readable program product comprising computer readable code which, when loaded onto a computer, configures the computer to perform the method according to claim 9.

* * * * *